E G. NEUMEIER.
PLATFORM LEVELER.
APPLICATION FILED FEB. 17, 1917.
1,262,829.
Patented Apr. 16, 1918.
2 SHEETS—SHEET 1.
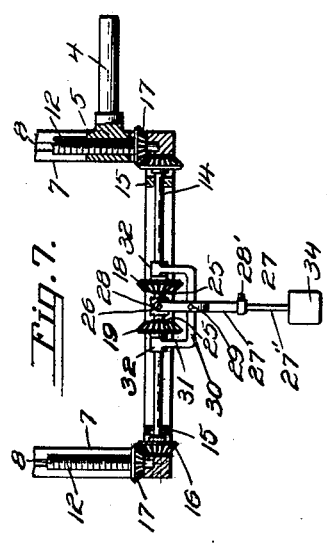
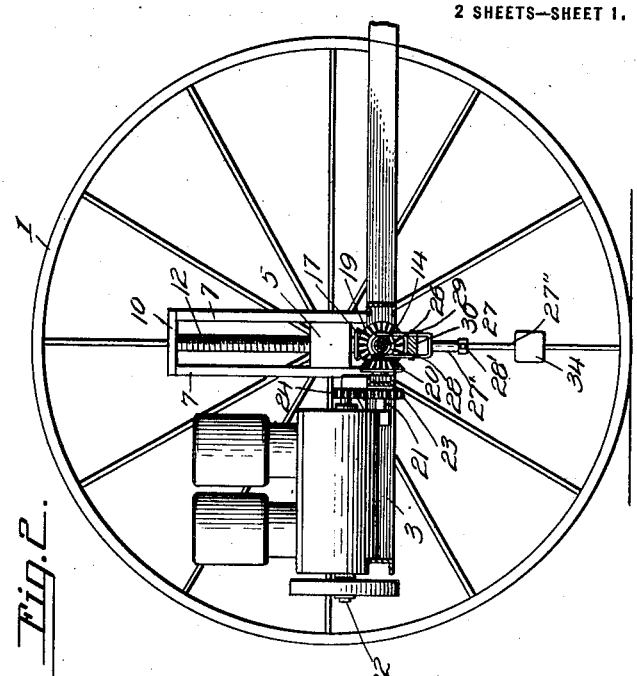
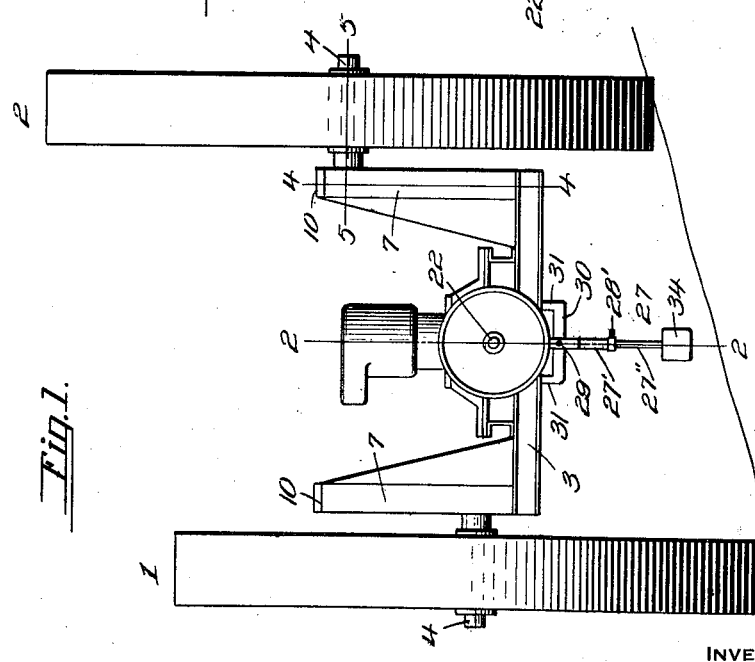
WITNESSES
F. C. Gibson.
Rodney M. Smith
INVENTOR
E. G. Neumeier.
BY Victor J. Evans
ATTORNEY E G. NEUMEIER.
PLATFORM LEVELER.
APPLICATION FILED FEB. 17, 1917.
1,262,829.
Patented Apr. 16, 1918.
2 SHEETS—SHEET 2.
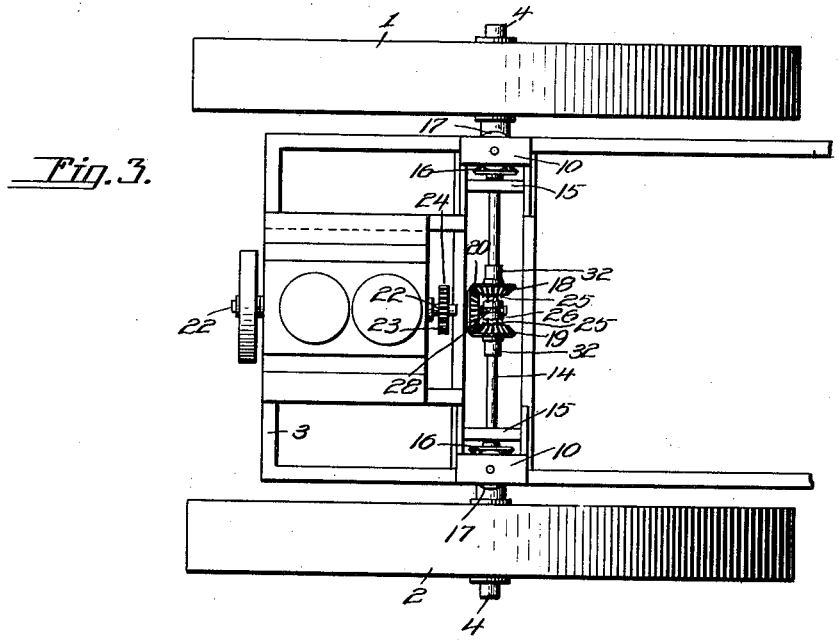
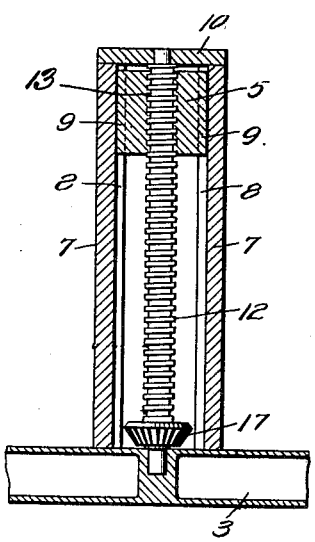
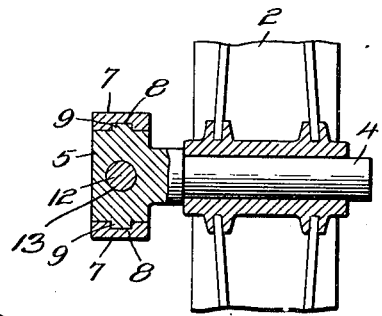
WITNESSES
INVENTOR
E G Neumeier
BY Victor J. Evans
ATTORNEY

UNITED STATES PATENT OFFICE.

EDMUND G. NEUMEIER, OF MOLINE, ILLINOIS.

PLATFORM-LEVELER.

1,262,829.   Specification of Letters Patent.   Patented Apr. 16, 1918.

Application filed February 17, 1917. Serial No. 149,305.

*To all whom it may concern:*

Be it known that I, EDMUND G. NEUMEIER, a citizen of the United States, residing at Moline, in the county of Rock Island and State of Illinois, have invented new and useful Improvements in Platform-Levelers, of which the following is a specification.

This invention comprehends improvements in leveling devices for tractor platforms, harvester platforms and the like and has for one of its objects the provision of simple and practical weight controlled means for automatically leveling the platform when one side of the machine is elevated.

Another object of the invention is to provide an automatical leveling device including a shifting clutch member actuated by a pendulum weight so mounted as to operatively engage the clutch member when the machine is tilted to one side or the other.

The invention also aims to generally improve devices of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a rear elevation partly in section showing the position of the device when the right wheel of the tractor is elevated.

Fig. 2 is a section on the plane of line 2—2 of Fig. 1.

Fig. 3 is a fragmentary top plan view.

Fig. 4 is a section on the plane of line 4—4 of Fig. 1.

Fig. 5 is a section on the plane of line 5—5 of Fig. 1.

Fig. 6 is a detail perspective view of one of the axles and its sliding nut or block.

Fig. 7 is a transverse sectional view through the platform, the leveling mechanism associated therewith being shown in elevation.

Referring in detail to the drawings by numerals, 1 and 2 designate the rear wheels of a tractor having a platform 3 which it is desired to keep level at all times irrespective of the relative heights of the wheels.

In the preferred embodiment of my invention, I mount the wheels on stub axles 4, which are rigidly secured to sliding nuts or blocks 5 which are movable vertically between guides 7. The guides are supported by the platform 3 and are formed in their opposed faces with longitudinal grooves 8 to accommodate the ribs or teeth 9 on the blocks 5. These ribs hold the blocks properly between their guides and prevent any lateral or twisting movement of the blocks. Guides are arranged in pairs and the guides in each pair are connected at their upper terminals by a bridge piece 10 and at their lower ends by the platform 3.

Arranged between the guides of each pair is a worm or screw 12 journaled at its upper end in the bridge piece 10 and platform 3 respectively and working through the threaded opening 13 in the nut or block 5. When the worms are rotated, the nuts will travel upwardly or downwardly as will be clearly understood.

Extending transversely of the machine is a shaft 14 suitably mounted in bearings 15 and carrying adjacent its ends beveled gears 16 fixed thereon and meshing with similar gears 17 fixed on the worms. Loosely mounted on the shaft 14 are a pair of bevel gears 18 and 19 which are continuously driven by the driving or master gear 20 mounted on the shaft 21, which latter is driven from the engine-shaft 22 by any suitable means such as the gears 23 and 24.

Each of the gears 18 and 19 is provided on its inner face with a clutch member 25 adapted to be engaged by the opposed end of the double clutch member 26. This latter is tubular and is splined on the shaft 14.

To automatically shift the clutch member 26, I provide a pendulum arm 27 forked at its upper end for engagement in the annular groove 28 of the clutch member and pivotally secured intermediate its ends on the pivot pin 29. The pivot pin is carried by a swinging frame generally designated 30 having upwardly extending arms 31 loosely connected to the shaft 14 by the sleeves or collars 32. A weight 34 is adjustably mounted on the pendulum arm 27 and this arm is preferably formed by the two telescoping sections 27′ and 27″ which are locked together by the screw 28′.

In operation when the right side of the machine is elevated, the pendulum arm, in seeking to maintain a vertical position, will engage the clutch member 26 with the clutch member on the gear 18, and the shaft 14 will be rotated to drive the worms so as to lower the left axle and raise the right axle, thus leveling the platform. When the platform is leveled, the clutch member 26 will move into neutral position so as to stop the rotation of the worms 12. An elevation of the left wheel of thte machine will operate to raise the left axle and lower the right axle to restore the platform to a level position.

The method of mounting the pendulum arm 27 pivotally on the swinging frame 30 is a feature of prime importance, since it allows the arm to hang always in a vertical position irrespective of the transverse and longitudinal tilt of the tractor.

The weight 34 may be adjusted on the pendulum arm to cause the same to swing quickly or slowly and the pendulum arm may be shortened if necessary, to clear stone, stumps, and other obstacles which may be in the path of the tractor. When not in use, the pendulum arm may be swung into a horizontal out of the way position secured thus by any suitable means.

From the foregoing description taken in connection with the accompanying drawings, it will be apparent that I have provided a very simple and efficient leveling device which will quickly restore a vehicle platform to a level position when tilted and which is entirely automatic in its operation.

While I have shown and described the preferred embodiment of my invention, it will be clearly understood that I do not wish to be limited to this construction, but may make such changes as will fall within the scope and spirit of the invention as claimed.

What I claim is:—

1. In combination with a platform, vertical guides mounted thereon, blocks slidable on said guides, a worm for raising and lowering each of said blocks, a stub axle connected to each of said blocks, wheels mounted on said axles, a shaft, gears fixed on said shaft, gears fixed on said worms meshing with said first mentioned gears, a pair of gears loosely mounted on said shaft, means for continuously driving said gears, in opposite directions, a clutch member formed on the inner face of each of the last mentioned gears, a double ended clutch member splined to said shaft and a pendulum weight for automatically engaging the slidable clutch member with one or the other of the first mentioned clutch members.

2. In combination with a platform, vertical guides thereon, blocks mounted to slide on said guides, axles connected with the blocks, wheels on said axles, worms upon which said blocks are mounted operable to raise and lower the blocks, means for rotating said worms in opposite directions, a clutch member engageable with said means, and a pendulum weight adapted to engage said clutch member with said means.

3. In combination with a platform, wheels and axles, automatic platform leveling means including vertical movable blocks to which said axles are connected, worms for raising and lowering the blocks, a shaft, gears connecting said shaft with said worms, gears loose on said shaft, means for continuously driving said gears in opposite directions, a clutch member for locking said gears to the shaft, a pivotally mounted weight arm for shifting said clutch member, and a swinging frame supporting said weight arm.

4. In an automatic leveling device for vehicle platforms, a shaft, gears loosely mounted on said shaft, means for continuously driving said gears, a clutch member splined on the shaft for clutching engagement with one or the other of said gears, a swinging frame mounted on the shaft, an arm pivoted to said frame and loosely engaging said clutch member to shift the same, said arm being adjustable in length and a weight adjustably mounted on the arm.

In testimony whereof I affix my signature.

EDMUND G. NEUMEIER.